US009232151B1

(12) United States Patent
Azuma (10) Patent No.: US 9,232,151 B1
(45) Date of Patent: Jan. 5, 2016

(54) SINGLE SENSOR TWO-SIDED CAMERA

(71) Applicant: Amazon Technologies, Inc., Reno, NV (US)

(72) Inventor: Eddie Alex Azuma, Pleasanton, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/319,427

(22) Filed: Jun. 30, 2014

(51) Int. Cl.
*H04N 5/335* (2011.01)
*H04N 5/235* (2006.01)

(52) U.S. Cl.
CPC .................... *H04N 5/2353* (2013.01)

(58) Field of Classification Search
CPC .................................... H01L 27/0694
USPC .................................. 348/308, 362
See application file for complete search history.

(56) References Cited

U.S. PATENT DOCUMENTS

| 6,150,708 A | 11/2000 | Gardner |
| 2011/0058053 A1 | 3/2011 | Roh |
| 2012/0274800 A1 | 11/2012 | Vakil |
| 2013/0063641 A1 * | 3/2013 | Venezia et al. ............. 348/308 |

FOREIGN PATENT DOCUMENTS

WO  2011149451 A1  12/2011

OTHER PUBLICATIONS

Co-pending U.S. Appl. No. 13/681,847, filed Nov. 20, 2012.

* cited by examiner

*Primary Examiner* — Joel Fosselman
(74) *Attorney, Agent, or Firm* — Seyfarth Shaw LLP; Ilan N. Barzilay; David A. Klein (57) ABSTRACT

A single dual-sided image sensor is shared by two cameras to capture images using both a front-side and a back-side of the image sensor. At different times, the image sensor is front-side illuminated by one camera to capture a first image, and back-side illuminated by the other camera to capture a second image. The two cameras, as configured in a device, face in a same direction, but are spatially offset.

22 Claims, 7 Drawing Sheets

SINGLE SENSOR TWO-SIDED CAMERA

BACKGROUND

Cameras have become a ubiquitous feature on mobile devices such as cellular telephones. Many such devices include multiple cameras, such as a high resolution camera on the back of the device for digital photography, and a lower resolution camera on the front of the device next to the display to support video telephony and the taking of self-portraits.

BRIEF DESCRIPTION OF DRAWINGS

For a more complete understanding of the present disclosure, reference is now made to the following description taken in conjunction with the accompanying drawings.

Unless stated otherwise, the figures are not drawn to scale and the relative sizes of features are not proportional.

DETAILED DESCRIPTION

Space is at a premium inside mobile devices, where a difference in component sizes on the order of a few millimeters may require significant design trade-offs, impacting device features such as thickness, camera resolution, and battery capacity. Adding multiple cameras to a device entails dedicating space for additional optical systems (lenses, shutters, etc.), as well as the added space, power, and wiring requirements for an additional image sensor and control electronics.

Figure 1:
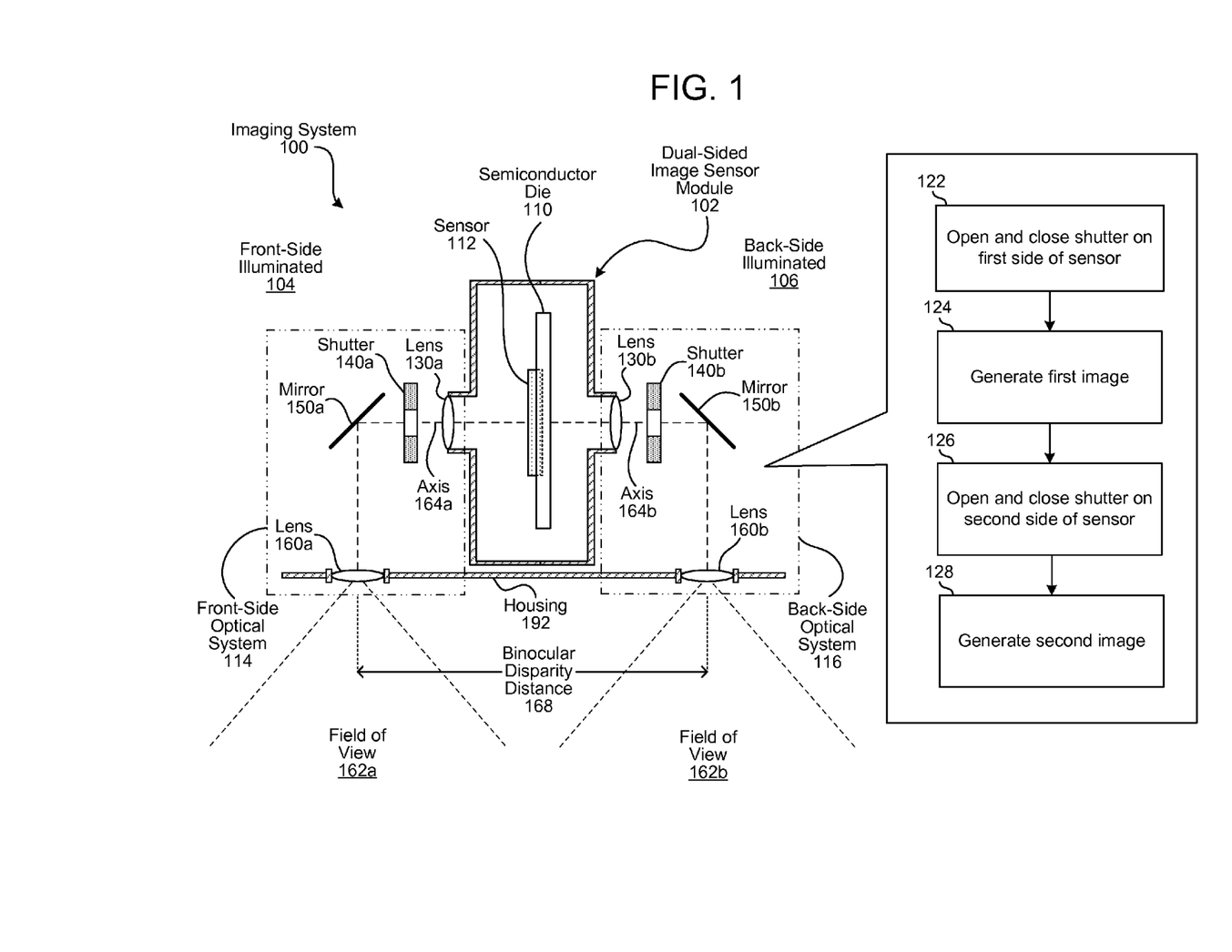
FIG. 1 illustrates a system for capturing images using both the front-side and back-side of a single image sensor.

FIG. 1 illustrates an imaging system 100 where a single image sensor 112 may serve as two cameras, being selectively front-side illuminated (104) and back-side illuminated (106). Shutters 140a, 140b on opposite sides of the dual-sided image sensor module 102 selectively expose one or the other side of the image sensor 112.

To manufacturer an image sensor, multiple image sensors may be constructed on a surface of a semiconductor wafer (also known as a semiconductor substrate). The semiconductor wafer is then divided (e.g., sliced, diced, cut, or cleaved) into multiple smaller "dies." A die including an integrated circuit ("IC") (e.g., sensor 112) may also be referred to as a "chip." In the parlance of image sensors, light that is shone directly on the image sensor 112 (for example, light entering the module through lens 130a) is referred to "front-side illumination," and light that passes through the die 110 (for example, light entering the module through lens 130b) to reach the image sensor is referred to as "back-side illumination." Thus, the side of the sensor 112 facing the semiconductor die 110 may be referred to as the back side, while the other side of the sensor 112 may be referred to as the front side.

The front-side illuminated (104) side of the imaging system 100 may include an outer lens 160a connected to a housing 192 of a device and providing a front-side optical system 114 with a field of view 162a. Light passes through lens 160a to a mirror 150a, to redirect a path of incident light (e.g., along optical axis 164a) to reach inner lens 130a and the front side of the sensor 112. Somewhere along the path, the incident light passes through a shutter 140a of the front-side optical system 114. The shutter 140a selectively allows light to pass through, and may be outside the outer lens 160a, or somewhere between the outer lens 160a and the front-side of the sensor 112. As illustrated, the shutter 140a is between the mirror 150a and the inner lens 130a.

Similarly, the back-side illuminated (106) side of the imaging system 100 may include an outer lens 160b connected to a housing 192 of a device and providing a back-side optical system 116 with another field of view 162b. Light passes through lens 160b to a mirror 150b, to redirect a path of incident light (e.g., along optical axis 164b) to reach inner lens 130b and pass through the semiconductor die 110 to the back side of the sensor 112. Somewhere along the path, the incident light passes through a shutter 140b of the back-side optical system 116. The shutter 140b selectively allows light to pass through, and may be outside the outer lens 160b, or somewhere between the outer lens 160b and the back-side of the sensor 112. As illustrated, the shutter 140b is between the mirror 150b and the inner lens 130b.

Other components may be included, such as filters, additional optics, and electromechanical elements (e.g., electromechanical elements to modify zoom or focus). Components of the imaging system 100 may be physically separate from the image sensor module 102 or may be integrated in whole or in part into the module 102, such as integrating the shutters 140a, 140b and mirrors 150a, 150b into the module 102. The reverse is also true, such as using inner lenses 130a, 130b that are separate from the image sensor module 102. As illustrated, the mirrors 150a, 150b are angled at forty-five degrees. Other structures may be used to redirect the optical path (axes 164a, 164b) instead of mirrors 150a, 150b, such as reflective prisms.

As arranged in FIG. 1, depending in part on the overlap of the fields-of-view 162a and 162b facing in a same direction, the image system 100 can be used for stereoscopic photography by operating (122) a shutter (140a or 140b) on a first side of the sensor 112, generating (124) first image data, operating (126) the other shutter (140b or 140a), and generating (128) second image data. Stereoscopic photography captures two images with a parallax that provides "binocular disparity," simulating human vision by positioning the cameras to have a spatial relationship approximately the same as the left and right eyes on a human head (binocular disparity distance 168), and providing similar overlap in the fields of view 162a, 162b (in comparison to human vision).

The two outer lenses 160a and 160b, in addition to being spatially offset by the binocular disparity distance 168 apart, are in a same plane. The optical path length (e.g., along axis 164a) for light passing through the front-side optical system 114 to the active area of the image sensor 112 and the optical path length (e.g., along axis 164b) for light passing through the back-side optical system 116 to the active area of the image sensor 112 may be equal or close to equal, where an "optical path length" is the product of the geometric length of the path light follows through the system and the index of refraction of the mediums through which it propagates.

Human eyes are horizontally separated by about fifty to seventy eight millimeters (inter-pupillary distance (IPD) between centers of each pupil), with binocular disparity distance 168 separating lens 160a and lens 160b corresponding to this IPD range (i.e., fifty to seventy eight millimeters, lens-center to lens-center). The IPD mean value is approximately sixty two millimeters for females, and sixty five millimeters for males, such that the binocular disparity distance 168 in the range of sixty two to sixty five millimeters may be statistically advantageous. Although the two images are not captured simultaneously, if the alternating exposures are performed in rapid succession, offset stereoscopic viewpoints of a same scene may be captured, providing a stereoscopic perspective of the scene with a single image sensor. In addition, by repeatedly alternating back-and-forth between the sides of the sensor in rapid succession, stereoscopic video can be generated.

Figure 2:
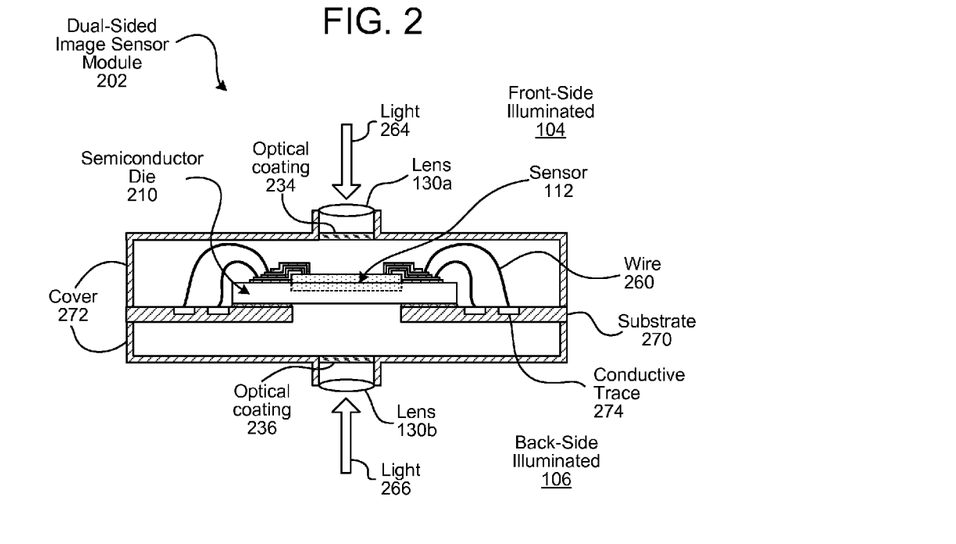
FIGS. 2 to 5 show examples of dual-sided image sensor modules.

FIG. 2 illustrates a dual-sided image sensor module 202 as an example of the dual-sided image sensor module 102, with light 264 and light 266 selectively incident on opposite sides of the sensor 112. The light 266 incident on the back side passes through the semiconductor die 210 to reach the image sensor 112, whereas the light 264 incident on the front side does not. The structures that provide internal electrical connections within the sensor 112 and provide electrical external connections off of the die 210 (e.g., conductive layers, insulating dielectric layers) are patterned to avoid blocking a path of light to each pixel (i.e., the optically active area of the sensor 112).

The dual-sided image sensor module 202 in FIG. 2 utilizes conventional wire bonding, with wires 260 providing external electrical connectivity to the sensor 112. An electrically non-conductive substrate 270 includes a hole for the light 266 to reach the back side of the image sensor 112, and also includes conductive traces 274 to which ends of the wires 260 are connected. Among other arrangements, the traces 274 may lead to an edge of the module 202, to be connected to external circuits, a power supply, etc. Inner lenses 130a, 130b are connected to the cover 272 of the module 202 on opposite sides of the sensor 112.

A front-side optical coating or coatings 234 may optionally be included on the front-side illuminated 104 side of the sensor 112 (e.g., one or more coatings on a piece of glass attached to cover 272), and a back-side optical coating or coatings 236 may optionally be included on the back-side illuminated 106 side of the sensor 112 (e.g., one or more coatings on a piece of glass attached to cover 272 as shown, or to the substrate 270). If included, these coatings 234, 236 may be the same, or may be different. For example, one or both coatings may include layers such as an anti-reflective coating, a wavelength-filtering coatings, and/or an array of micro-lenses to increase the amount of light captured by each individual sensor pixel. For among other reasons, if the front-side and back-side are being used to capture different wavelengths of light, these coatings 234, 236 may be different.

Figure 3:
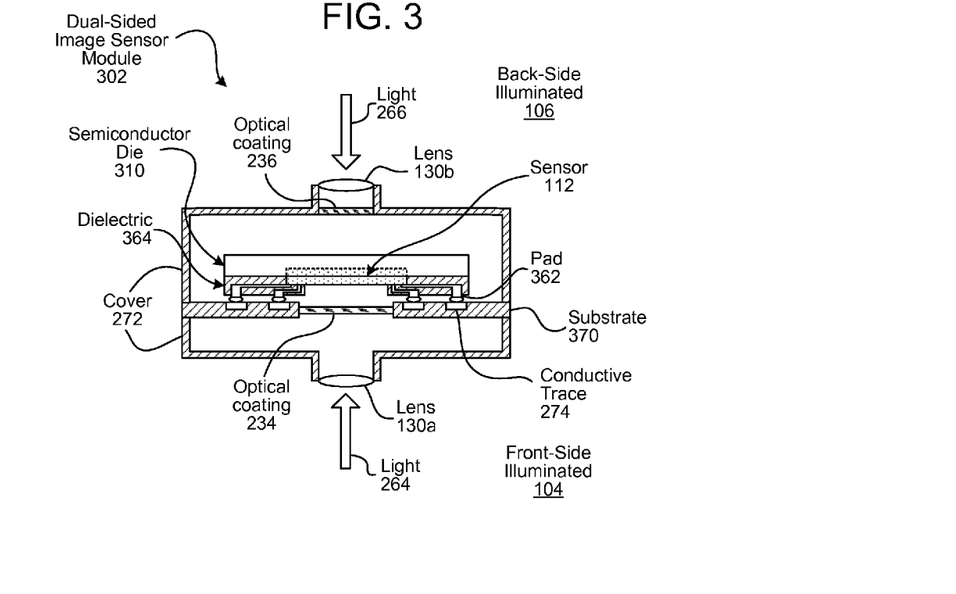

FIG. 3 illustrates a dual-sided image sensor module 302 as another example of the dual-sided image sensor module 102. The semiconductor die 310 is configured as a "flip-chip," where conductive pads 362 formed on the front side of the die 310 are used to provide external electrical connections to the sensor 112. The conductive pads 362 and electrically-insulating dielectric 364 do not extend into the area over the optically active area of the image sensor 112. The conductive pads 362 are conductively bonded to the conductive traces 274 of a substrate 370. Similar to the substrate 270 in FIG. 2, the substrate 370 provides a hole through which light 264 passes to reach a front-side of the image sensor 112. The back-side optical coating 236, if included, may be attached to the cover 272, and the front-side optical coating may be attached to the substrate 370 (as shown), or to cover 272).

The front-side illuminated (104) and the back-side illuminated (106) sides of the image sensor 112 may be used to capture images of a same resolution, or may be used to capture images at different resolutions. For example, the image sensor 112 may be an eight mega-pixel image sensor, and one side may be configured to use all eight million pixels, while the other side is configured to only use the middle two million pixels. In such an arrangement, the optically "active" area on one side of the sensor 112 may be smaller than the other, such that structures over the smaller active area may encroach further toward the optical axis than on the other side. Referring to FIG. 2, if the front-side illuminated 104 side has the smaller optically active area, then the electrically conductive structures on the die 210 at a periphery of the image sensor 112 (to which the wires 260 are bonded) can extend in closer to the optical axis, since the outer pixels of the sensor 112 are not being used from that side. Likewise, referring to FIG. 3, if the front-side illuminated 104 side has the smaller optically-active area, then the conductors including the pads 362 and the dielectric 364 can extend in closer to the optical axis. As result of being able to move the conductors in closer to the middle of the active area (the middle of the active area corresponding to the optical axis), the size of the die can be reduced and/or the number of electrical connections can be increased in a same area.

Figure 4:
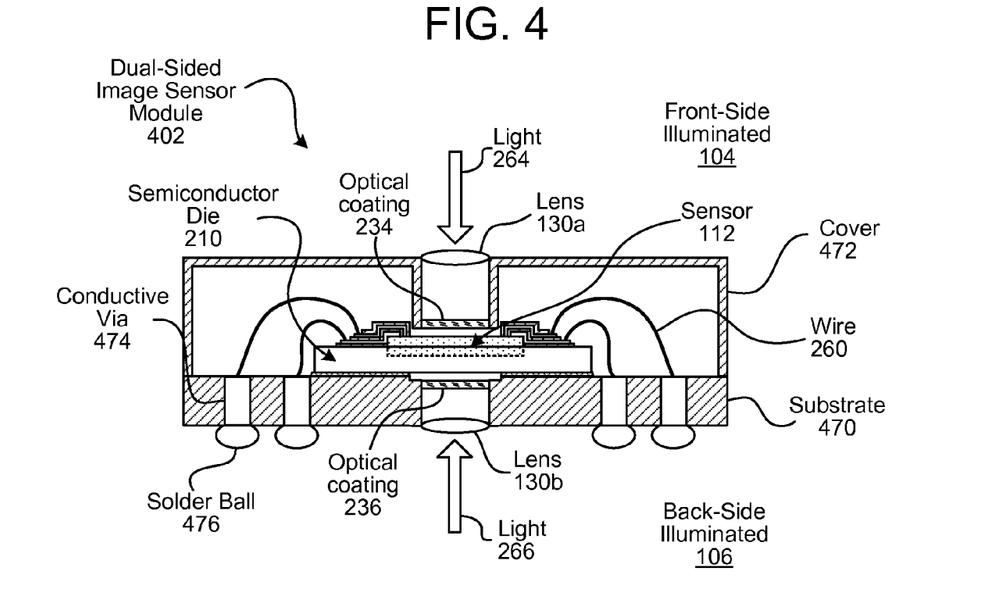

FIG. 4 illustrates a dual-sided image sensor module 402 as another example of the dual-sided image sensor module 102. In this example, the semiconductor die 210 is wire bonded to a substrate 470 arranged to support ball-grid array mounting (e.g., to a printed circuit board). The substrate 470 includes a hole through which light 266 reaches the image sensor 112. A front-side lens 130a is connected to the module's cover 472, whereas the back-side lens 130b is connected to the substrate 470. As illustrated, the front-side optical coating 234 is attached to the cover 472 and the back-side optical coating 436 is attached to the substrate 470.

Figure 5:
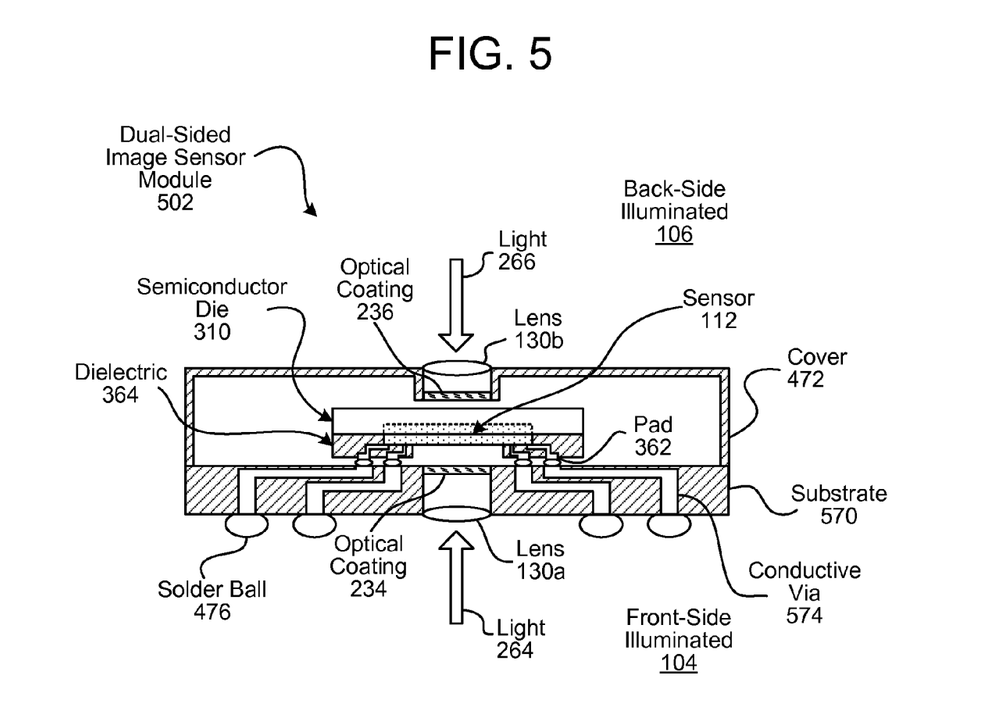

FIG. 5 illustrates a dual-sided image sensor module 502 as another example of the dual-sided image sensor module 102. In this example, the semiconductor die 310 is arranged as a flip-chip coupled to a substrate 570. The substrate 570 is arranged to support ball-grid array mounting, and includes a hole through which light 264 reaches the front side of the image sensor 112. As illustrated, back-side optical coating 236 is attached to the cover 472, and the front-side optical coating 234 is attached to the substrate 570.

Figure 6:
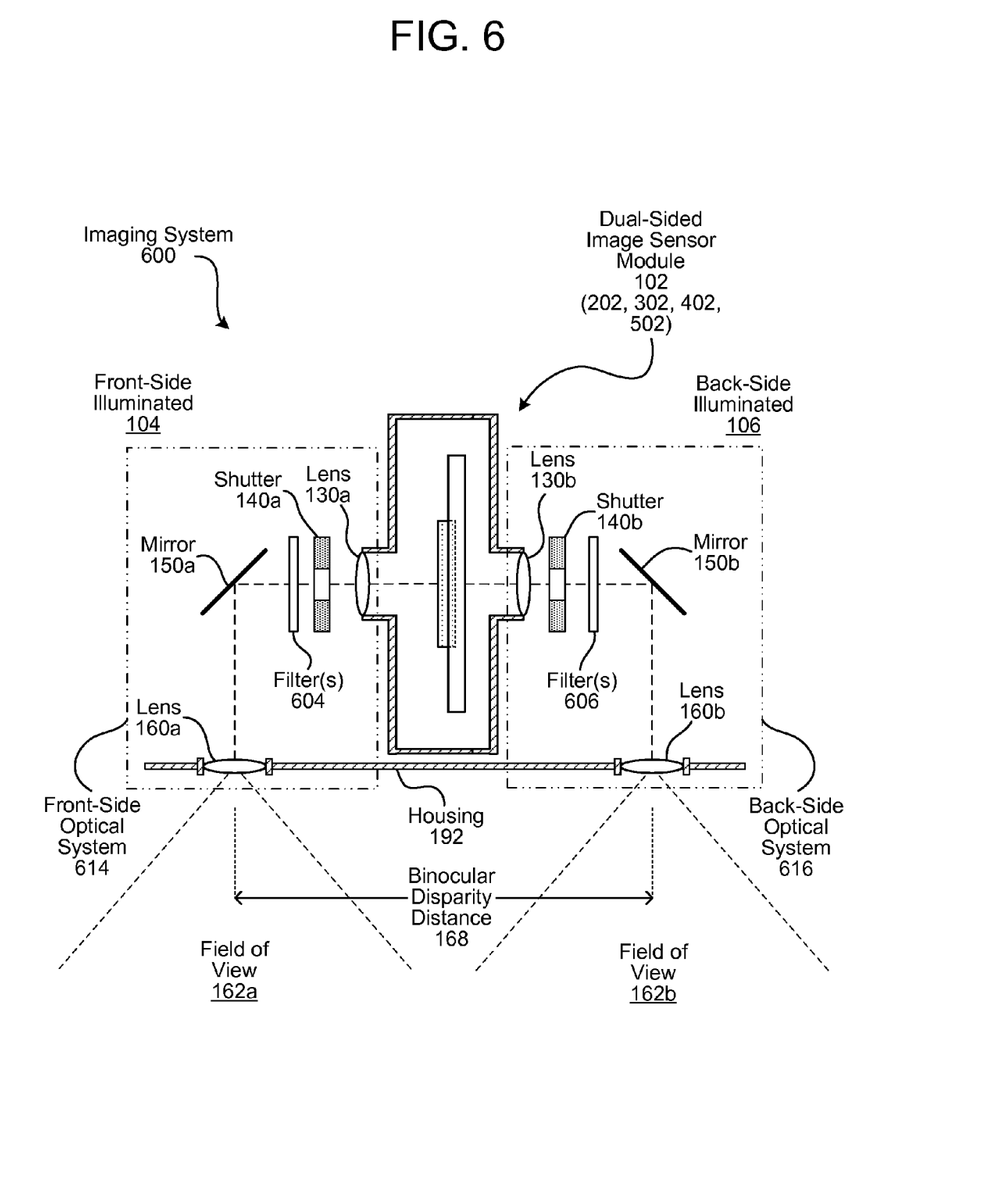
FIG. 6 illustrates an example of an optical system utilizing a dual-sided image sensor module.

FIG. 6 illustrates an imaging system 600 which adds optical filters 604, 606 to the stereoscopic imaging system 100 of FIG. 1. The filter 604 of the front-side optical system 614 and the filter 606 of the back-side optical system 616 may be the same or may be different depending upon the wavelengths to be captured by the respective sides. Each filter 604, 606 may be a single filter or a plurality of filters. Such filters may also be included as-or-with the optical coating 234, 236. Unfiltered, conventional image sensors can capture both visible light and infrared. Some image sensors can also capture some of the ultraviolet spectrum.

If a side of the dual-sided image sensor module 102 (e.g., 202, 302, 402, 502) is being used for color photography, then the filter may be a color filter made up of red, green, and blue filters, such as a Bayer filter. A high-pass filter to attenuate infrared (passing visible light, which is composed of light having higher frequencies than infrared) and a low-pass filter to attenuate ultraviolet (passing visible light, which is composed of light having lower frequencies than ultraviolet) may also be included to attenuate unwanted wavelengths. Such filters may also be included with (or instead of) the optical coating 234, 236. Depending in-part on the type of filter, the filter 604 may be placed anywhere along the optical path of the front-side optical system 614, and the filter 606 may be placed anywhere along the optical path of the back-side optical system 616.

If a side of the dual-sided image sensor module 102 is being used for infrared imaging, the infrared-side filter may be a low-pass filter to attenuate visible light, and/or a band pass filter or filters to attenuate wavelengths other than a selected portion of the infrared spectrum.

If both sides of the image sensor module 102 are used to capture color and the optics provide a similar depth of field and focus, and the overlapping fields of view 162a, 162b provide a parallax similar to human vision, the single sensor of the module 102 may be used to capture stereoscopic images by capturing images from each side in succession, as described with FIG. 1.

By including no filter on one side, or a high-pass filter to attenuate infrared (without a color filter, resulting in grayscale images), and a color filter on the other, by applying edge detection algorithms to the infrared or unfiltered side, the contrast of edges may be used to determine the shape of an object or the distance to an object. For example, by looking at two edges of a same object in two pictures, changes between the edges can be used to approximate a change in distance to the object.

Figure 7:
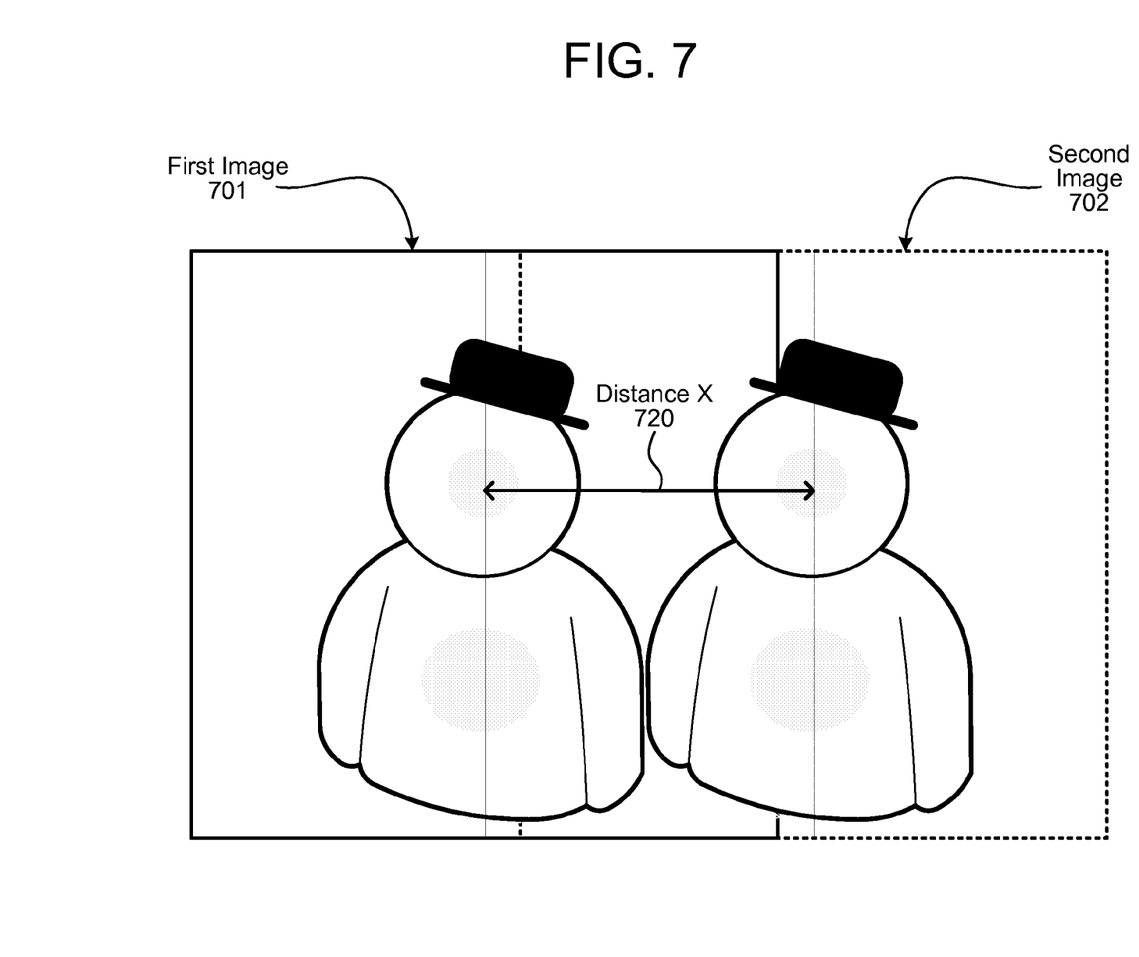
FIG. 7 illustrates the offset of an object between the left and right sides of a stereoscopic image.

For example in FIG. 7, a first image 701 and a second image 702 are captured by exposing opposite sides of the image sensor 112 in succession. Due to parallax produced by lens separation (distance 168), a captured object is offset by a distance X (720) between images. This shift in the object (or edges, or other features, etc.) between images can be used as a basis for depth measurements.

Figure 8:
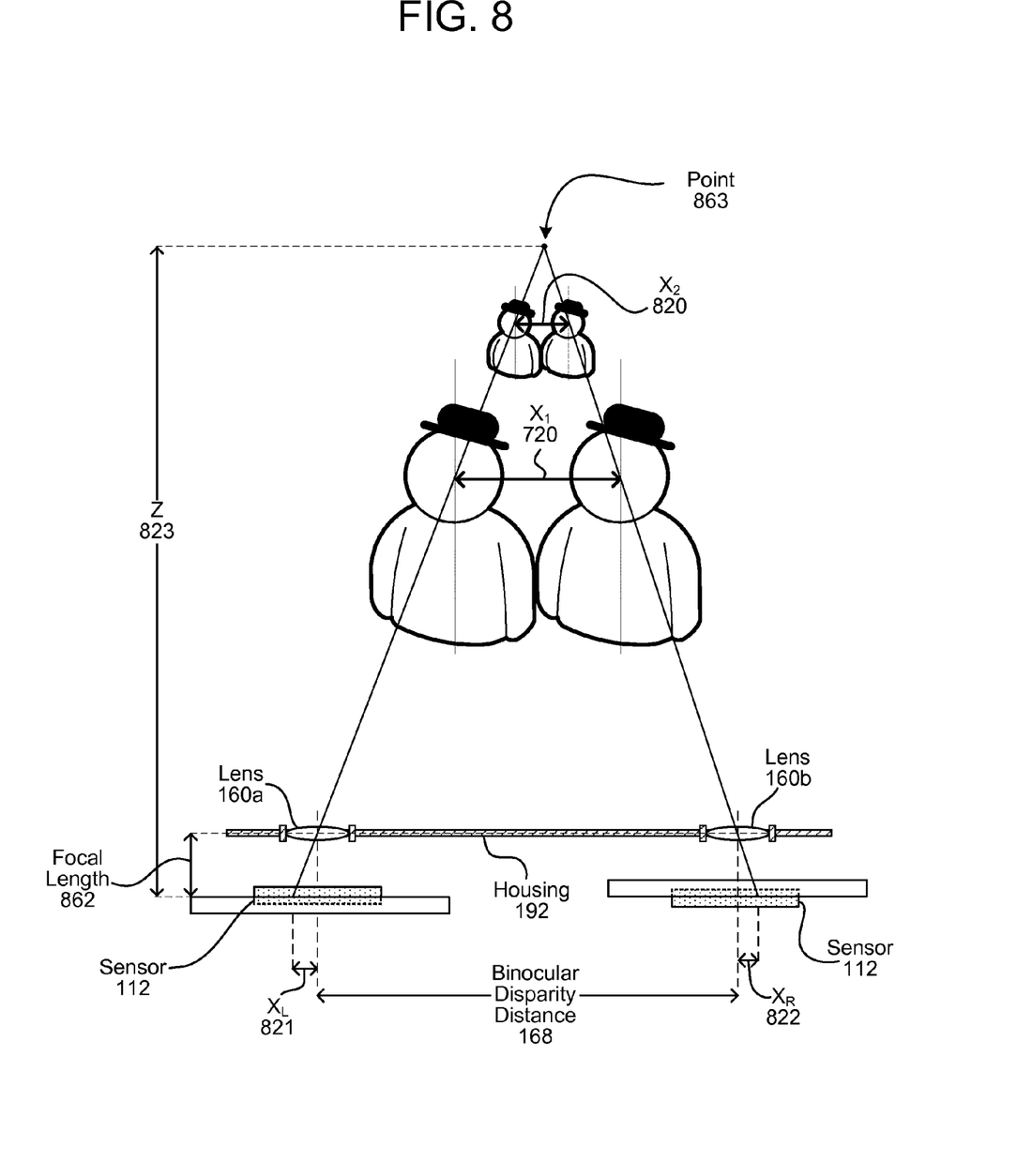
FIG. 8 illustrates geometries that may be used to determine the distance to an object using the left and right images.

FIG. 8 is a further illustration of calculating distance to an object. The disparity between the images is the difference between $X_L$ (821) and $X_R$ (822). The disparity is large when the object is closer, and smaller when the object is further, corresponding to the change in offset $X_1$ (720) from a first pair of images and offset $X_2$ (820) from a second pair of images. The offset is not perceptible at and beyond the "vanishing point."

By calculating the distance Z (823) to the point 863, the approximate distance to the actual object may be approximated from the image disparity. Using the focal length "f" (862) from the outer lenses 160a, 160b to the active area of the image sensor, disparity may be determined as:

$$\text{disparity} = X_L - X_R = \frac{Bf}{Z} \quad (1)$$

where B is binocular disparity distance (168). As B and f are predetermined for the optical system, and $X_L$ and $X_R$ may be determined from the image data, the distance to the object Z may be solved for as:

$$Z = \frac{Bf}{X_L - X_R} \quad (2)$$

The example in FIG. 8 uses a same focal length "f" (862) for the front side and back side optical systems. The actual focal length (i.e., the optical path length) may be configured to be approximately the same for both the front side optical system 114 and the back side optical system 116. Difference in focal length may occur on opposite sides due to differences in refractive indexes of any filters, different geometric path lengths, and the difference in refractive indexes between the surface layers of the sensor 112 from the front side versus the refractive index of the semiconductor die from the backside. In the alternative to engineering the front side optical system 614 and back side optical system 616 so that the focal length is the same on both sides, difference may be adjusted for mathematically, or ignored entirely (an increase in the difference in the optical path lengths resulting in an increase in the probability of error in the distance approximation, if the difference is ignored).

Filters 604, 606 used for distance approximation may be different. For example, one filter may be a color filter and the other filter may be an infrared filter. Also, while data from both images (i.e., front side image and back side image) may be used for distance calculations, one of the images may be preferentially output as a digital photograph or video (e.g., the color image), without outputting the other image (e.g., the infrared image). If the system is designed to focus on objects at a center of the image, the portion of the active area of the image sensor 112 used to capture the image used for autofocus range finding (i.e., distance approximation) may be smaller than the portion of the active area of the image sensor 112 used to generate the color photograph. Other filter combinations may be used instead.

Utilizing a smaller portion of the active area on the side of the image sensor used for distance approximation allows the image sensor to be made smaller, since wiring can encroach further toward a middle of the sensor on that side (as discussed above in connection with FIGS. 2-5). The secondary image used for distance approximation may also be read from the sensor more quickly than a full-resolution image. Also, power consumption may be reduced since less of the sensor is utilized to capture the secondary image and the processed secondary image is smaller.

For some applications, both sides may configured to capture infrared images. For example, for use in diagnostic equipment for infrared thermography and thermal imaging, one side may include a band pass filter tuned to a portion of the infrared spectrum, whereas the other side has a band pass filter tuned to a different portion of the infrared spectrum. Each filter may comprise an array to pass different bands of wavelengths of infrared energy, similar to how a Bayer filter comprises an array of filter elements each selectively passing red, green, or blue. Each array may comprise a plurality of different elements to selectively pass a wavelength band centered on a different wavelength, with the wavelength ranges of the first filter 604 being different than the second filter 606. For infrared thermography applications, a useful range of coverage for the two filter arrays is infrared wavelengths from approximately nine to fourteen microns, with one filter covering a first portion of the spectra, and the other filter covering the second portion of the spectra. For example, the first filter 604 and/or optical coating 234 may have array elements that pass infrared bands centered at 9.25, 10.15, and 11.05 microns, whereas the second filter 606 and/or optical coating 236 may have array elements that pass infrared bands centered at 11.95, 12.85, and 13.75 microns. By combining sequential images captured by opposite sides of the system, a single image sensor may be used to cover the electromagnetic spectrum commonly associated with thermography, providing improved temperature differentiation while providing wide-band thermography. Other wavelength ranges may also be used, and an individual filter array may have filter array elements spanning fewer or more than three bands.

The imaged wavelengths transmitted by different filters/filter elements may be configured to partially overlap (e.g., overlap of Gaussian-curve wavelength sensitivities), with the degree of overlap depending upon, among other things, the choice of filter element materials and the desired dynamic range of the imaging system. By tuning the sides to span different portions of the infrared spectrum, image data recording incident infrared light may be used to approximate a temperature of a radiating object based on the object's black-body radiation characteristics. Black-body radiation has a characteristic, continuous frequency spectrum that depends only on the body's temperature, called the Planck spectrum or Planck's law. The spectrum is peaked at a characteristic frequency that shifts to higher frequencies with increasing temperature, and at room temperature most of the emission is in the infrared region of the electromagnetic spectrum. By calibrating each side of the imaging system, an approximate temperature of imaged objects may be determined. In the alternative, the infrared filter arrays on both sides of the image sensor 112 may be the same, to generate a stereoscopic thermograph.

If one side of the image sensor is being used to capture infrared and the other side is not, it may be preferable to use the front-side illuminated 104 side of the sensor for the infrared. Although a thinning of the back side of the wafer that may be performed during manufacturing after forming the image sensor 112 may reduce noise resulting from infrared energy on the back side to acceptable levels, there is still an increased likelihood of noise being generated by infrared energy on the back side in comparison to the front side. Even so, either side may be used for either color or infrared.

When using the dual-sided image sensor module for stereoscopic photography, the image sensor may be calibrated to balance out differences in color ratios and brightness from one side to the other. This may be done before the module 102 is installed in a device, and application of the calibration coefficients may be performed by programmable logic included on the same die as the image sensor. An alternative solution is to store the calibration coefficients in a nonvolatile memory included on the die, to be accessed by a processor to perform calibration.

An electromechanical zoom mechanism may be integrated with each of the outer lenses 160a, 160b. Similarly, a focusing mechanism (e.g., moving optics and motor) may be integrated to move both of the inner lenses 130a, 130b or some other refractive optical component(s) to adjust focus. The optics of the front-side optical systems (114, 614) and the back-side optical systems (116, 616) on each side of the sensor module 102 may be configured the same, or may be different.

The "ultraviolet spectrum" or "ultraviolet light" refers to the portion of the electromagnetic spectrum with a wavelength shorter than that of visible light, but longer than X-rays, that is, in the range between four hundred nanometers and one hundred nanometers. It is so-named because the spectrum consists of electromagnetic waves with frequencies higher than those that humans identify as the color violet.

The "visible spectrum" or "visible light" refers to the portion of the electromagnetic spectrum that is visible to the human eye. A typical human eye will respond to wavelengths from about three-hundred ninety to seven hundred nanometers, which in terms of frequency, corresponds to a band in the vicinity of four hundred thirty to seven hundred ninety terahertz.

"Infrared," the "infrared spectrum," or "infrared light" refers to the portion of the electromagnetic spectrum that extends from about seven hundred nanometers to one millimeter. This range of wavelengths corresponds to a frequency range of approximately four hundred thirty terahertz to three hundred gigahertz. Most of the thermal radiation emitted by objects near room temperature is infrared.

The image sensors discussed above in the context of FIGS. 1-8 may be complementary metal-oxide semiconductor (CMOS) sensors, and the semiconductor dies may be silicon. Existing CMOS sensor designs are readily adaptable to serve as dual-sided sensors. So long as the sensor technology can be modified to allow light to reach pixels from both sides of a sensor, the principles discussed above may be applicable to other such sensor technologies.

Also, while a CMOS silicon image sensor can ordinarily sense light across an entirety of the visible spectrum, it may only be able to sense part of the infrared spectrum. Semiconductor materials other than silicon may be used as the substrate and to fabricate the sensors (e.g., III-V semiconductors), depending upon the range of wavelengths to be sensed, so long as the material accommodates the construction of sensors covering the portions of the electromagnetic spectrum to be captured, and does not appreciably attenuate the wavelengths to be captured by back-side illumination.

Any kind of physical shutter may be used as shutters 140a and 140b, such as mechanical shutters and electronic shutters (e.g., liquid crystal shutters). If a liquid crystal shutter is used, it may result in linearly polarized light. If so, the orientation of the shutter polarization may be set the same for both sides, or rotated ninety degrees so that the polarization of light captured by one side of the sensor is perpendicular to the other.

The mirrors 150a and 150b may be tuned to the wavelengths to be reflected. However, most conventional mirrors reflect both visible light and at least a portion of the infrared spectrum.

A device including the dual-sided image sensor module 102 (202, 302, 402, 502) may also include one or more light emission sources to illuminate a scene at wavelengths corresponding to the wavelengths to be captured by the image sensor. For example, the device may include a white source light such as a white light emitting diode (LED) if the image sensor is to capture a color or black-and-white image (e.g., a white LED flash), and an infrared light source such as an infrared LED if the image sensor is to capture an infrared image.

The duration the shutter is open on one side of the image sensor (i.e., exposure time) may be independent of the duration the other shutter is open. Conventional shutter-control algorithms may be used to automatically and independently control each shutter, and on some devices, a user may be provided an interface to manually control shutter duration. If different portions of the electromagnetic spectrum (i.e., different wavelengths of light) are being recorded via each shutter, the durations may differ based on light levels and image sensor sensitivity in the respective spectra.

Figure 9:
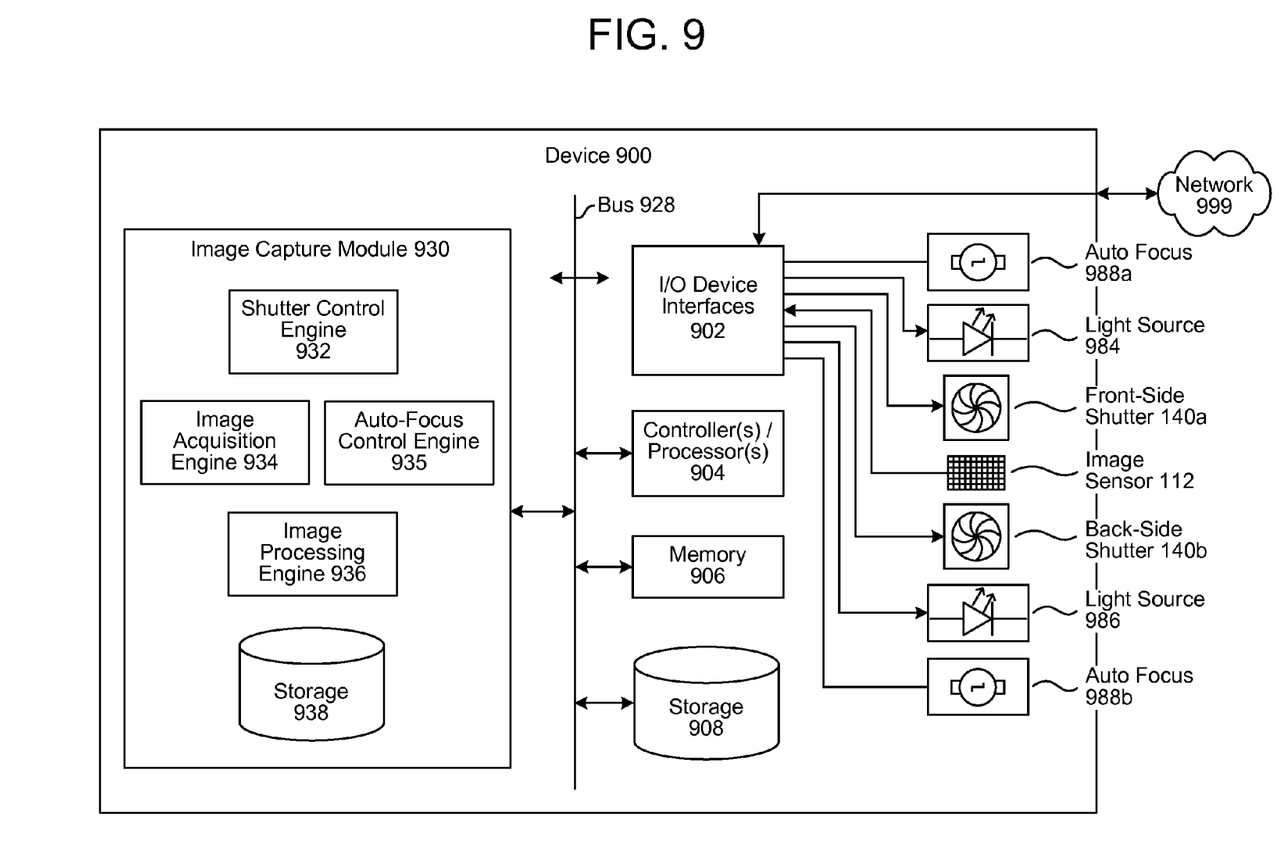
FIG. 9 is a block diagram conceptually illustrating example components of a device including the dual-sided image sensor module.

FIG. 9 is a block diagram conceptually illustrating example components of a device 900 including the double-sided image sensor 112. In operation, the device 900 may include computer-readable and computer-executable instructions that reside in memory 906 and/or storage 908/938, as will be discussed further below.

Static components of the optical systems such as mirrors and filters are omitted from FIG. 9. Although components of an auto-focus system are illustrates, other optional dynamic elements such as zoom control are omitted, but operation of such elements is well known in the art. Although illustrated as an auto-focus system, device 900 may be auto-focus, manual focus, or fixed focus.

The device 900 includes input/output (I/O) device interfaces 902 that support a variety of input and output components. Such components include the image sensor 112, the front-side optical system shutter 140a, the back-side optical system shutter 140b, a first light source 984 for use with the front-side optical system, a second light source 986 for use with the back-side optical system, a front-side illumination auto focus mechanism 988a, and a back-side illumination auto-focus mechanism 988b. Although the shutters 140a, 140b are illustrated as mechanical shutters, electronic shutters such as liquid crystal shutters may be used instead.

The first light source 984 emits light of a wavelength or range of wavelengths that will pass through the front-side optical system filter(s) 234/604, and may be used as a flash or similar illumination when capturing images using the front-side of the image sensor 112. Likewise, the second light source 986 emits light of a wavelength or range of wavelengths that will pass through the back-side optical system filter(s) 236/606, and may be used as a flash or similar illumination when capturing images using the back-side of the image sensor 112. As discussed above, the wavelengths emitted by the first and second light source 984, 986 may be different, such as one emitting white light and the other infrared, or both emitting infrared but in different parts of the infrared spectrum, depending on the individual configurations of the front-side or back-side optical systems.

The I/O device interfaces 902 may also provide wired or wireless connectivity to connect to external components and/or a network 999, such as providing wired connectivity via a universal serial bus (USB) and/or Ethernet port, and/or wireless connectivity for a wireless local area network (WLAN) (such as WiFi) radio, Bluetooth, a Long Term Evolution (LTE) network, WiMAX network, 3G network, etc. In addition to the wired ports and wireless connectivity, one or more ports may be provided for a memory card (not illustrated), such as CompactFlash and Secure Digital (SD) cards.

The I/O device interfaces 902 may support a wide variety of other input and output components, in addition to those illustrated.

The device 900 may include an address/data bus 928 for conveying data among components of the device 900. Each component within the device 900 may also be directly connected to other components in addition to (or instead of) being connected to other components across the bus 928.

The device 900 may include one or more controllers/processors 904, that may each include a central processing unit (CPU) for processing data and computer-readable instructions, and a memory 906 for storing data and instructions. The memory 906 may include volatile random access memory (RAM), non-volatile read only memory (ROM), non-volatile RAM and/or other types of memory. The device 900 may also include a data storage component 908, for storing data and controller/processor-executable instructions (e.g., instructions to perform steps 122 to 128 in FIG. 1). The data storage components 908 and 938 are of a non-volatile storage type such as optical, magnetic, or solid-state storage (e.g., Flash, magnetoresistive, phase-change). In addition, a portion of data storage component may be external to or added to the device 900, such as storage connected via the USB or Ethernet port, or as a memory card.

Computer instructions for operating the device 900 and its various components may be executed by the controller(s)/processor(s) 904, using the memory 906 as temporary "working" storage at runtime. The computer instructions may be stored in a non-transitory manner in non-volatile memory 906 or storage 908/938. Alternatively, some or all of the executable instructions may be embedded in hardware or firmware in addition to or instead of software.

The device 900 further includes an image capture module 930 that manages image acquisition and processing.

A shutter control engine 932 of the image capture module 930 controls operation of shutters 140a and 140b. Among other things, the shutter control engine 932 insures that during normal operation, the front-side shutter 140a is closed when the back-side shutter 140b is open, and that the back-side shutter 140a is closed when the front-side shutter 140b is open. The shutter control engine 932 works in coordination with the image acquisition engine 934 to control exposure duration, and to verify that image data to be recorded from the image sensor 112 has been fully offloaded from the sensor and that the image sensor 112 has been reset before permitting another exposure. When a stereoscopic photo is to be recorded, the image acquisition engine 934 will instruct the shutter control engine 932 to record image data by front-side illumination and then back-side illumination in rapid succession (or vice-versa).

The image acquisition engine 934 controls conventional operations, such as exposure duration and picture type (e.g., one image, stereoscopic, video capture, etc.). The image acquisition engine 934 may work in coordination with auto-focus engine 935, which controls the front side and back side auto-focus mechanisms 988a, 988b. When image data is to be recorded, the image acquisition engine offloads the image data from the image sensor 112 into memory 906 and/or storage 908/938, and resets the image sensor. The image acquisition engine may be specialized, may be of a conventional design used with dual-camera devices modified to acquire stereoscopic images using sequential (rather than simultaneous) exposures, or some combination thereof. The image acquisition engine 934 may determine whether the first light source 984 or second light source 986 is needed, but based on that determination, the activation of the respective light source may be controlled by either the shutter control engine 932 (to insure that the timing of the illumination synchronizes with shutter operation) or by image acquisition engine 934 itself.

The image processing engine 936 formats recorded image data, such as converting a captured image data into, among other things, a "JPEG" (Joint Photographic Experts Group), bitmap, "TIFF" (Tagged Image File Format), and/or raw image, into an "MPEG" (Moving Pictures Expert Group) or HEVC (High Efficiency Video Coding) video format, and/or wrapping/bundling data into videos or other multiple-image formats.

If calibration of the front and back sides of the image sensor 112 is performed by the device 900, the image acquisition engine 934 may compare front-side and back-side images and calculate calibration coefficients. The calibration coefficients may then be stored in storage 938, and used by image process engine 936 when processing images. If calibration is done prior to the integration of the dual-sided image sensor module 102 in the device 900, the calibration coefficients may also be stored in storage 938.

As noted above, programmable logic and nonvolatile memory may be fabricated on the dies, together with the image sensors. Some or all of the engines of image capture module 930, as well as the I/O device interfaces 902, controller(s)/processor(s) 904, memory 906 may be integrated on the semiconductor die 110/210/310 with the image sensor 112. Any type of programmable logic may be included (e.g., an application specific integrated circuit (ASIC), a microprocessor, a field programmable gate array (FPGA), etc.). Shutter control engine 932 may be implemented, among other ways, as a state machine. Some or all of storage 908/938 may also be integrated on the semiconductor die 110/210/310 as solid-state memory (e.g., Flash, magnetoresistive random access memory (MRAM)) and/or read-only memory. The calibration coefficients and software/firmware-based executable instructions used by the programmable logic (if any) may be stored on-die.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of electro optics, optical sensors, optics, digital cameras, and infrared and stereoscopic photography should recognize that components and process steps described herein may be interchangeable with other components or steps, or combinations of components or steps, and still achieve the benefits and advantages of the present disclosure. For example, in each of the illustrated imaging systems (100, 600), optical components may be arranged in a different, such as the position of the shutters and the filters. As another example, the optical components on one side of the sensor module 102 may be different than the optical components on the other. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A device, comprising:
    an image sensor having a front side and a back side, the back side being opposite the front side, with the image sensor configured to be illuminated from the front side and configured to be illuminated from the back side;
    a first exterior lens having a first optical axis and exposed to an exterior of the device to transmit incident light from the exterior of the device to the front side of the image sensor;
    a second exterior lens having a second optical axis and exposed to the exterior of the device to transmit incident light from the exterior of the device to the back side of the image sensor, the second exterior lens arranged in a same plane as the first exterior lens, wherein the first optical axis of the first exterior lens and the second optical axis of the second exterior lens are perpendicular to the same plane, are in parallel with each other, and are separated by a distance between fifty and seventy eight millimeters as measured from centers of the first exterior lens and the second exterior lens;
    a first shutter arranged to selectively pass light to illuminate the front side of the image sensor;
    a first interior lens disposed between the front side of the image sensor and the first exterior lens;
    a second shutter arranged to selectively pass light to illuminate the back side of the image sensor;
    a second interior lens disposed between the back side of the image sensor and the second exterior lens; and
    a controller communicatively coupled to the first shutter and the second shutter, the controller configured to:
        control opening and closing of the first shutter and the second shutter, wherein if the first shutter is open the second shutter is closed, and if the second shutter is open the first shutter is closed,
        determine first image data by causing the front side of the image sensor to be exposed to the incident light, and
        determine second image data by causing the back side of the image sensor to be exposed to the incident light,
        wherein the first image data and the second image data correspond to different perspectives of a same scene.

2. The device of claim 1, further comprising:
    a first filter that attenuates visible light but allows infrared light to pass through to illuminate the front side of the image sensor; and
    a second filter that attenuates visible light but allows infrared light to pass through to illuminate the back side of the image sensor.

3. A system comprising:
    an image sensor, the image sensor comprising a front side and a back side, the back side being opposite the front side, with the image sensor configured to be illuminated from the front side and configured to be illuminated from the back side;
    a first lens arranged to direct light to illuminate the front side of the image sensor;
    a second lens arranged to direct light to illuminate the back side of the image sensor; and
    a housing including at least the image sensor, the first lens, and the second lens,
    wherein the first lens and the second lens are exposed to the exterior of the housing to transmit incident light from the exterior of the housing to an interior of the housing, the first lens and the second lens being arranged on a same side of the housing and spatially separated.

4. The system of claim 3, wherein the first lens has a first optical axis and the second lens has a second optical axis, where a spatial separation between the first optical axis of the first lens and the second optical axis of the second lens is between fifty and seventy eight millimeters as measured from centers of each lens.

5. The system of claim 3, wherein a first optical path length from the first lens to an active area of the image sensor is approximately equal to a second optical path length from the second lens to the active area of the image sensor.

6. The system of claim 3, further comprising:
    a first shutter arranged to selectively pass light to illuminate the front side of the image sensor;
    a first mirror or a first prism disposed between the first lens and the front side of the image sensor to redirect light to illuminate the front side of the image sensor;
    a second shutter arranged to selectively pass light to illuminate the back side of the image sensor; and
    a second mirror or a second prism disposed between the second lens and the back side of the image sensor to redirect light to illuminate the back side of the image sensor.

7. The system of claim 6, further comprising a controller coupled to the first shutter and to the second shutter, and configured to operate the first shutter to expose the front side of the image sensor to incident light to capture first image data, and to operate the second shutter to expose the back side of the image sensor to incident light to capture second image data, the first and second image data to provide different perspectives of a scene.

8. The system of claim 7, the controller further configured to calculate a distance to an object based on a difference in perspective between the first image data and the second image data.

9. The system of claim 8, further comprising:
    a first filter that attenuates visible light but allows infrared light to pass through to illuminate the front side of the image sensor; and a second filter that attenuates visible light but allows infrared light to pass through to illuminate the back side of the image sensor.

10. The system of claim 8, wherein the controller is further configured to output a digital photograph based on the first image data, wherein the second image data is used to calculate the distance but is not output, and the first image data is captured using a larger portion of the active area of the image sensor than the second image data.

11. The system of claim 8, wherein the controller is further configured to output a digital photograph based on the second image data, wherein the first image data is used to calculate the distance but is not output, and the second image data is captured using a larger portion of the active area of the image sensor than the first image data.

12. The system of claim 7, further comprising:
a first filter that attenuates visible light but allows infrared light of a first portion of an infrared spectrum to pass through to illuminate the front side of the image sensor; and
a second filter that attenuates visible light but allows infrared light of a second portion of the infrared spectrum to pass through to illuminate the back side of the image sensor, the second portion of the infrared spectrum being different than the first portion of the infrared spectrum,
wherein the first filter and the second filter are configured so that a combination of the first image data and the second image data provides a thermographic image.

13. A method of operating an electronic device, comprising:
controlling, by programmable logic of the electronic device, a first shutter to pass light within a first field of view received through a first lens to illuminate a front side of an image sensor;
controlling, by the programmable logic, the image sensor to capture first image data representing a scene from a first perspective, synchronized with the first shutter passing the light within the first field of view to illuminate the front side of the image sensor;
controlling, by the programmable logic, a second shutter to pass light within a second field of view received through a second lens to illuminate a back side of the image sensor; and
controlling, by the programmable logic, the image sensor to capture second image data representing the scene from a second perspective, synchronized with the second shutter passing the light within the second field of view to illuminate the back side of the image sensor,
wherein the first field of view and the second field of view overlap, and a difference between the first perspective and the second perspective corresponds to a spatial separation between a first optical axis of the first lens and a second optical axis of the second lens.

14. The method of claim 13, wherein a distance between the first optical axis of the first lens and the second optical axis of the second lens is between fifty and seventy eight millimeters, as measured from centers of each lens, the method further comprising:
outputting a stereoscopic image based on the first image data and the second image data.

15. The method of claim 14, further comprising:
filtering light that illuminates the front side of the image sensor to attenuate visible light and transmit infrared light; and
filtering light that illuminates the back side of the image sensor to attenuate visible light and transmit infrared light,
wherein the stereoscopic image is a thermographic stereoscopic image.

16. The method of claim 13, further comprising:
calculating a distance to an object in the scene based on a difference between the first perspective and the second perspective.

17. The method of claim 16, wherein one of the first image data and the second image data is used to calculate the distance but is not output.

18. The method of claim 17, wherein capturing the first image data comprises reading data from a larger area of the image sensor than is read when capturing the second image data, the method further comprising outputting a digital photograph based on the first image data, wherein the second image data is used to calculate the distance but is not output.

19. The method of claim 17, wherein capturing the second image data comprises reading data from a larger area of the image sensor than is read when capturing the first image data, the method further comprising outputting a digital photograph based on the second image data, wherein the first image data is used to calculate the distance but is not output.

20. The method of claim 13, further comprising:
filtering the light that illuminates the front side of the image sensor to attenuate visible light and transmit infrared light of a first portion of the infrared spectrum;
filtering the light that illuminates the back side of the image sensor to attenuate visible light and transmit infrared light of a second portion of the infrared spectrum; and
outputting a thermographic image based on a combination of the first image data and the second image data.

21. The device of claim 1, wherein a first optical path length from the first exterior lens to the front side of the image sensor is approximately equal to a second optical path length from the second exterior lens to the backside of the image sensor.

22. The device of claim 1, further comprising:
a first mirror or a first prism disposed between the first exterior lens and the front side of the image sensor to redirect light transmitted by the first exterior lens to illuminate the front side of the image sensor; and
a second mirror or a second prism disposed between the second exterior lens and the back side of the image sensor to redirect light transmitted by the second exterior lens to illuminate the back side of the image sensor.

* * * * *